(12) United States Patent
Tam et al.

(10) Patent No.: US 11,656,688 B2
(45) Date of Patent: May 23, 2023

(54) SYSTEM AND METHOD FOR GESTURE ENABLEMENT AND INFORMATION PROVISIONING

(71) Applicant: Dell Products L.P., Round Rock, TX (US)

(72) Inventors: Amy Li Tam, Austin, TX (US); Terry Lane Matula, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 17/110,754

(22) Filed: Dec. 3, 2020

(65) Prior Publication Data

US 2022/0179494 A1    Jun. 9, 2022

(51) Int. Cl.
*G06F 3/01* (2006.01)
(52) U.S. Cl.
CPC .............. *G06F 3/017* (2013.01); *G06F 3/012* (2013.01); *G06F 3/013* (2013.01)
(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | | |
|---|---|---|---|---|
| 8,994,613 B1* | 3/2015 | Johnson | | G06F 16/40 345/178 |
| 10,271,010 B2* | 4/2019 | Gottlieb | | H04N 7/141 |
| 10,372,203 B2* | 8/2019 | Skogö | | G06F 3/0304 |
| 10,505,924 B1* | 12/2019 | Barakat | | H04W 12/64 |
| 10,853,978 B1* | 12/2020 | Knas | | G06F 3/0481 |
| 10,928,904 B1* | 2/2021 | Novelli | | H04N 7/15 |
| 11,067,805 B2* | 7/2021 | Edwin | | G06T 19/20 |
| 11,350,026 B1* | 5/2022 | Manzari | | H04N 5/232935 |

(Continued)

OTHER PUBLICATIONS

Salehifar, Hananeh, Peyman Bayat, and Mojtaba Amiri Majd. "Eye gesture blink password: a new authentication system with high memorable and maximum password length." *Multimedia Tools and Applications* 78.12 (2019): 16861-16885; Abstract only.

*Primary Examiner* — William Lu
(74) *Attorney, Agent, or Firm* — McDermott Will & Emery LLP

(57) ABSTRACT

A system for provisioning information to a user comprises a first display for displaying information for an application executing on an information handling system and a second display with a first zone for displaying information associated with the application and a second zone for displaying information associated with the information handling system. A biometric sensor determines which display the user is viewing. If the user is viewing the first display, eye tracking software determines actions based on the application. If the user is viewing the second display, eye tracking software determines if the user is viewing the first zone or the second zone. If the user is viewing the first zone, advanced or additional information associated with the application is displayed. If the user is viewing the second zone, advanced or additional information associated with the information handling system is displayed.

19 Claims, 5 Drawing Sheets

(56) References Cited

U.S. PATENT DOCUMENTS

| | | | |
|---|---|---|---|
| 11,402,871 B1* | 8/2022 | Berliner | G06F 3/011 |
| 11,435,830 B2* | 9/2022 | Moussette | G06F 3/04817 |
| 11,442,535 B2* | 9/2022 | Son | G02B 27/0093 |
| 2009/0249244 A1* | 10/2009 | Robinson | G06F 3/0481 |
| | | | 715/781 |
| 2014/0085198 A1* | 3/2014 | Jahnke | G06F 3/013 |
| | | | 345/157 |
| 2014/0129987 A1* | 5/2014 | Feit | G06F 3/04817 |
| | | | 715/835 |
| 2014/0354539 A1* | 12/2014 | Skogo | G06F 3/013 |
| | | | 345/156 |
| 2015/0085251 A1* | 3/2015 | Larsen | G06F 3/013 |
| | | | 351/206 |
| 2015/0135132 A1* | 5/2015 | Josephson | H04W 4/021 |
| | | | 715/784 |
| 2015/0192991 A1* | 7/2015 | Dal Mutto | G06F 3/0482 |
| | | | 715/747 |
| 2016/0179193 A1* | 6/2016 | Du | A61B 3/113 |
| | | | 345/633 |
| 2016/0188181 A1* | 6/2016 | Smith | G06F 3/0412 |
| | | | 715/765 |
| 2016/0246384 A1* | 8/2016 | Mullins | G06F 3/017 |
| 2017/0153797 A1* | 6/2017 | Cox | G06F 3/0482 |
| 2017/0206412 A1* | 7/2017 | Kaehler | G06T 19/006 |
| 2018/0190376 A1* | 7/2018 | Hill | G06T 19/006 |
| 2018/0329574 A1* | 11/2018 | Klein | G06F 1/1641 |
| 2019/0019218 A1* | 1/2019 | Thompson | H04N 13/398 |
| 2019/0064513 A1* | 2/2019 | Bagherpour | G06F 3/0484 |
| 2019/0073820 A1* | 3/2019 | Barron | G06T 15/506 |
| 2019/0102986 A1* | 4/2019 | Nelson | G06F 3/04815 |
| 2019/0121522 A1* | 4/2019 | Davis | G02B 27/0172 |
| 2019/0235496 A1* | 8/2019 | Dehais | G01C 23/00 |
| 2020/0117413 A1* | 4/2020 | Pollard | G06F 3/1423 |
| 2020/0209962 A1* | 7/2020 | Dey | G06F 3/013 |
| 2021/0082371 A1* | 3/2021 | Novelli | G09G 5/10 |
| 2021/0090323 A1* | 3/2021 | Hazra | G06T 7/74 |

* cited by examiner

SYSTEM AND METHOD FOR GESTURE ENABLEMENT AND INFORMATION PROVISIONING

BACKGROUND

Field of the Disclosure

This disclosure relates generally to information handling systems and, more particularly, to systems and methods for gesture enablement and information provisioning.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be used for gaming and other applications in which the application places higher demands on processing, memory and other functionality of the information system and in which the user is also under higher stress.

SUMMARY

Embodiments disclosed herein may be generally directed to systems and methods to enable a user of an information handling system to use gestures to communicate with the information handling system. The systems and methods may also use eye tracking to determine where the user is looking and provide advanced information based on the location.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
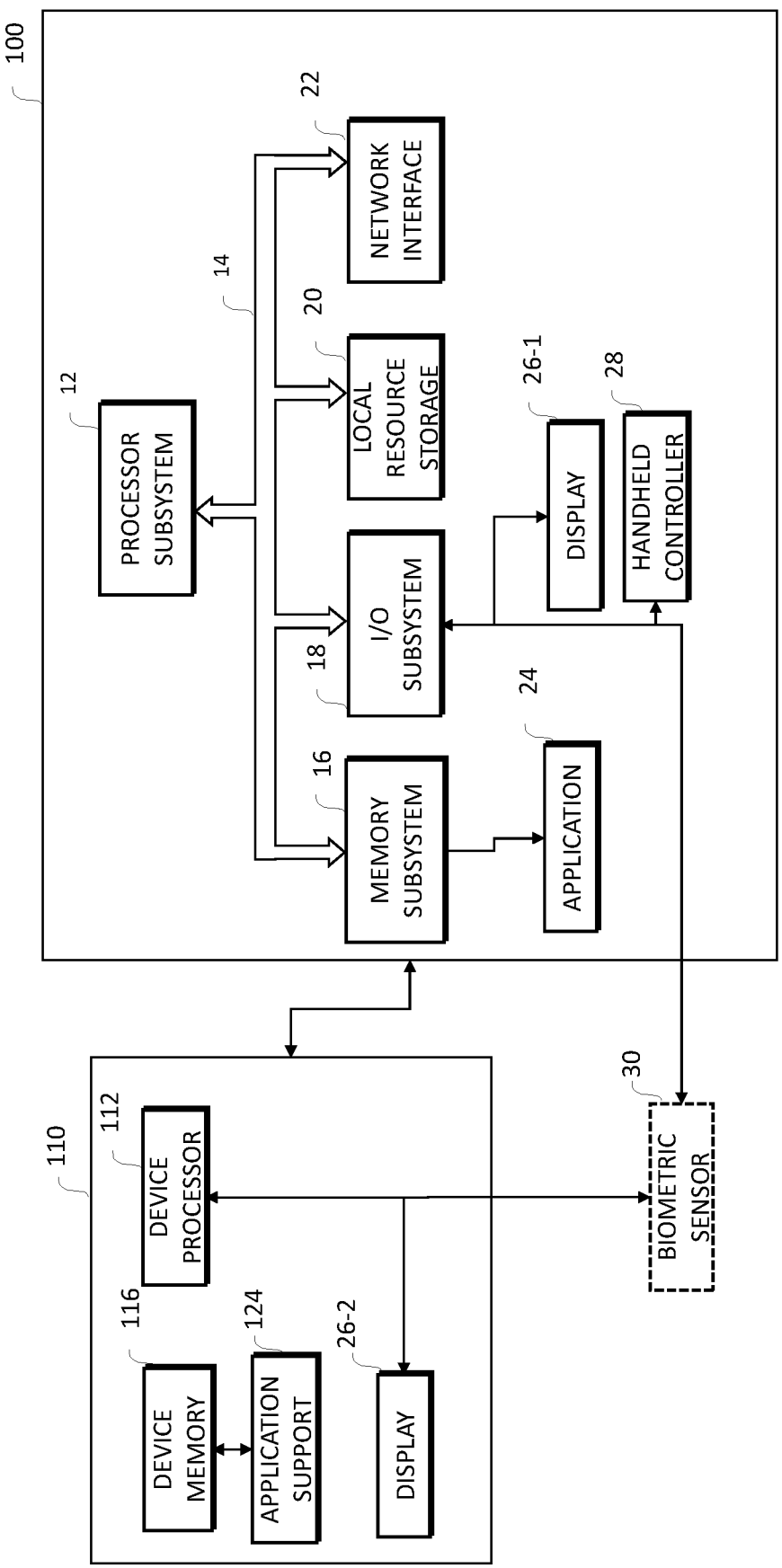
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, display "26-1" refers to an instance of a display, which may be referred to collectively as displays "26" and any one of which may be referred to generically as display "26."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments allow users to communicate with an information handling system when the information handling system is running an application that requires user input. For example, during high stress gaming situations, a user may want to maintain hand and finger contact with a keyboard or controller configured for manipulating actions on a display. Embodiments disclosed herein include an information handling system with a system for enabling a user to view a display and communicate with gestures and provisioning information while allowing the user to maintain contact with the keyboard or controller.

Biometric sensors such as face detection sensors determine if the user is looking at a first display displaying the application outputs for the user or a second display displaying application parameters and system performance parameters. When the user is looking at the first display, the information handling system may determine a direction in which the user is looking and perform functions associated with the application. When the user is looking at the second display, a processor associated with the second display may determine a direction in which the user is looking. If the user is looking at a first zone, the processor may display advanced information related to application functions. If the user is looking at a second zone, the processor may display advanced information related to system performance functions.

Embodiments disclosed herein are described with respect to gaming applications but may be useful for other applications. Particular embodiments are best understood by reference to FIGS. 1-3 and 4A-4C, wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling system 100 may include, but are not limited to, a processor subsystem 12, which may comprise one or more processors, and a system bus 14 that communicatively couples various system components to processor subsystem 12 including, for example, a memory subsystem 16, an I/O subsystem 18, local storage resource 20, and network interface 22. Information handling system 100 may be configured to execute application 24 stored in memory subsystem 16, display information on first display 26-1, communicate with user input 28, and may include or be communicatively coupled to biometric sensor 30. Information handling system 100 may be communicatively coupled to device 110. Components of device 110 may include, but are not limited to, device processor 112, device memory 116, second display 26-2 and application support 124. Device 110 may include or be communicatively coupled to biometric sensor 30.

Each of processor subsystem 12 and device processor 112 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 12 may interpret and execute program instructions and process data stored locally (e.g., in memory subsystem 16 or device memory 116). In the same or alternative embodiments, processor subsystem 12 and device processor 112 may interpret and execute program instructions and process data stored remotely (e.g., in a network storage resource).

System bus 14 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Each of memory subsystem 16 and device memory 116 may comprise a system, device, or apparatus operable to retain and retrieve program instructions and data for a period of time (e.g., computer-readable media). Memory subsystem 16 and device memory 116 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 18 may comprise a system, device, or apparatus generally operable to receive and transmit data to or from or within information handling system 100. I/O subsystem 18 may represent, for example, a variety of communication interfaces, graphics interfaces, video interfaces, user input interfaces, and peripheral interfaces. In various embodiments, I/O subsystem 18 may be used to support various peripheral devices, such as a touch panel, display 26-1, user input 28 such as a keyboard or a touch pad, and biometric sensor 30, among other examples. In some implementations, I/O subsystem 18 may support so-called 'plug and play' connectivity to external devices such as a handheld controller 28 for user input, in which the external devices may be added or removed while information handling system 100 is operating.

Local storage resource 20 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 22 may be a suitable system, apparatus, or device operable to serve as an interface between information handling system 100 and a network (not shown). Network interface 22 may enable information handling system 100 to communicate over a network using a suitable transmission protocol or standard. In some embodiments, network interface 22 may be communicatively coupled via a network to a network storage resource (not shown). A network coupled to network interface 22 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 22 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 22 or various components associated therewith may be implemented using hardware, software, or any combination thereof.

Figure 2:
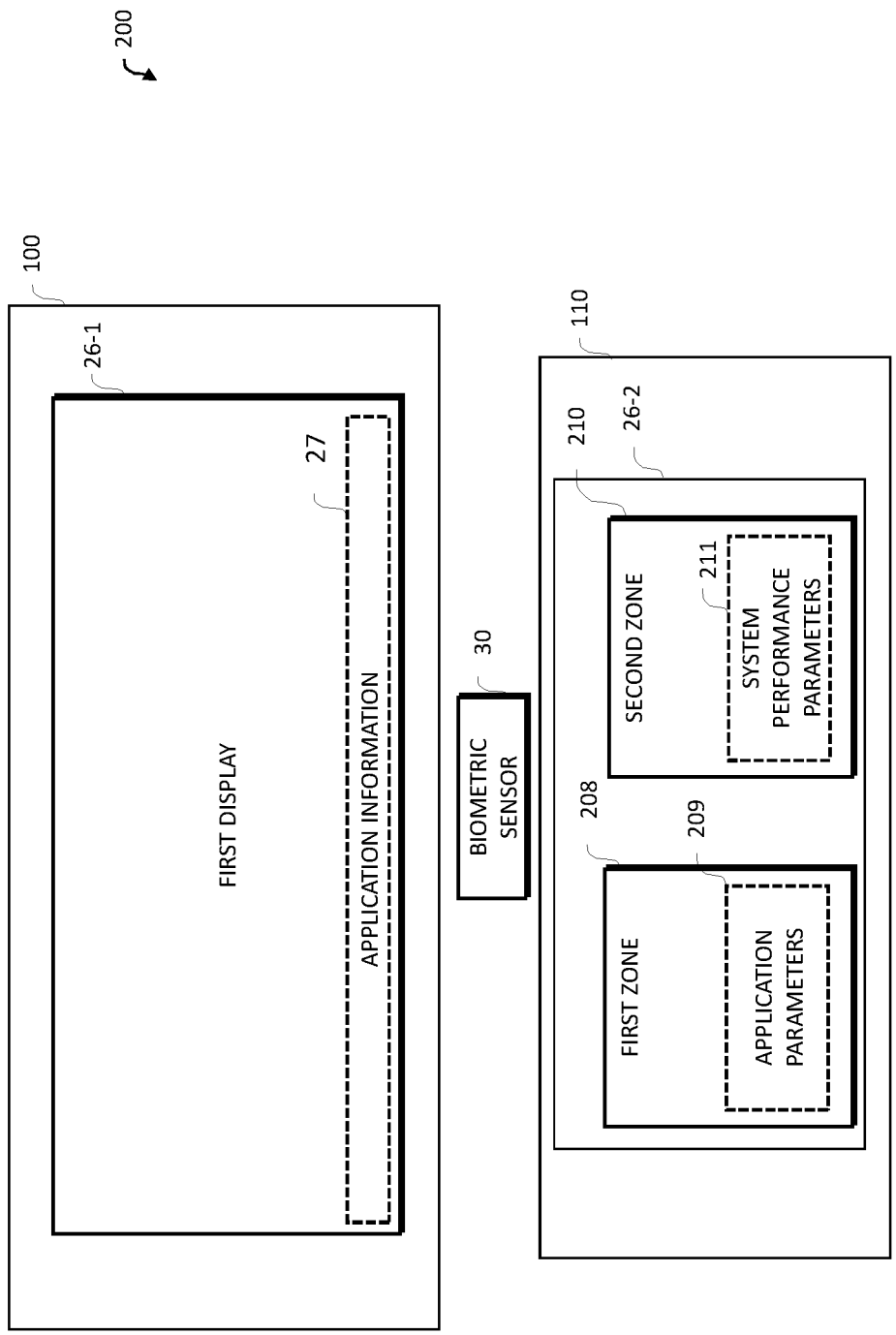
FIG. 2 is a diagram of selected elements of an information handling system with a system for gesture enablement and information provisioning.

Referring to FIGS. 1 and 2, a user may want to use information handling system 100 to run application 24 stored in memory subsystem 16 and display information on display 26-1. During execution of application 24, processing by information handling system 100 may result in high power consumption, high CPU usage, high GPU usage, high operating temperatures, decreased memory input/output performance, or other system performance parameters. Furthermore, parameters associated with application 24 may change. Displaying all information associated with application parameters for application 24 and system performance parameters for information handling system 100 may require more area on first display 26-1 and require more processing by components of information handling system 100. To alleviate some of the processing required by components of information handling system 100 and still display application parameters for application 24 and system performance parameters for information handling system 100, embodiments may include device 110. To determine whether the user wants to interact with application 24 executing on information handling system 100 or interact with application support 124 executing on device 110, embodiments may use biometric sensor 30 to determine which display 26-1 or 26-2 the user is viewing. In some embodiments, biometric sensor 30 may comprise commercially available technology configurable to communicate with device processor 112. In some embodiments, device 110 may include a camera (not shown) and device processor 112 may execute instructions to determine that a person is positioned in front of device 110. In some embodiments, device processor 112 may determine that processor 26 is executing application 24 to display application information 27 on first display 26-1 and processor 112 is executing instructions to display application parameters 209 or system performance parameters 211 on second display 26-2, and may execute instructions to utilize the camera for biometric sensing. If the user is viewing first display 26-1, second processor 112 may execute instructions to utilize the camera as biometric sensor 30 to perform eye tracking or other biometric sensing and interpret gestures or eye movements of the user as inputs for application 24. If the user is viewing second display 26-2, embodiments may determine whether the user wants to view application parameters associated with application 24 or view system performance parameters for information handling system 100. In some embodiments, second processor 112 may execute instructions to utilize the camera as biometric sensor 30 to perform eye tracking to determine which zone the user is viewing.

FIG. 2 depicts a system diagram illustrating a system 200 for gesture enablement and information provisioning. As depicted in FIG. 2, first display 26-1 may display application information 27 and second display 26-2 may display application parameters 209 in first zone 208 and display system performance parameters 211 in second zone 210. Biometric sensor 30 may be positioned relative to both information handling system 100 and device 110 to determine if the user is looking at first display 26-1 or second display 26-2. If the user is looking at second display 26-2, biometric sensor 30 may determine if the user is looking at first zone 208 or second zone 210. In some embodiments, biometric sensor 30 may be capable of detecting user gestures and tracking eye movements of a user. User gestures may include a user tilting their head to switch between viewing first display 26-1 and second display 26-2.

Application information 27 may refer to information displayed as a result of application 24 executing on information handling system 100. In a gaming application 24, application information 27 may be, for example, information about the health, shield strength, speed or other information about a user's character. A user may want to view application information 27 to ensure successful execution of application 24. Application information 27 may be displayed at the top of first display 26-1 (as shown) or elsewhere on first display 26-1.

Application parameters 209 may refer to parameters displayed in conjunction with application 24. In a gaming application 24, application parameters 209 may include, but are not limited to, information that may assess a user's overall skill, teamwork, aggressiveness, or strategic or tactical execution of the game. For example, application parameters 209 may include a total, an average, a ratio or an efficiency. In some embodiments, application parameters 209 may include an average score the user has achieved based on all matches played by the user, a K/D/A (kills/deaths/assists) ratio for the user, an econ rating (e.g. the amount of damage dealt per credits spent in-game), first bloods (e.g., the number of times a user has attacked first), plants (e.g., the number of times the user has planted a mine, bomb or spike) and diffuses (e.g., the number of times the user has defused a mine, bomb or spike) and other parameters such as ranking among all users playing application 24. Application parameters 209 may have no effect on the outcome of any one match played, but a user may want to view application parameters 209 to evaluate their performance over time or compare their accomplishments with others.

System performance parameters 211 may refer to parameters of information handling system 100 executing program 24. System performance parameters 211 may include, but are not limited to, battery capacity, GPU frequency, CPU temperature, GPU temperature, memory upload speed, memory download speed and core clock speed. A user may want to view system performance parameters to ensure their information handling system is operating properly or optimally for application 24.

As mentioned above, during high stress gaming situations, a user may want to maintain hand and finger contact with a keyboard or controller configured for manipulating actions on a display. The user may also want to view application information 27, application parameters 209 and system performance parameters 211, but displaying all the possible information may prevent the user from maximizing use of application 24. To ensure the user can view information when needed, embodiments include a method for gesture enablement and information provisioning.

Figure 3:
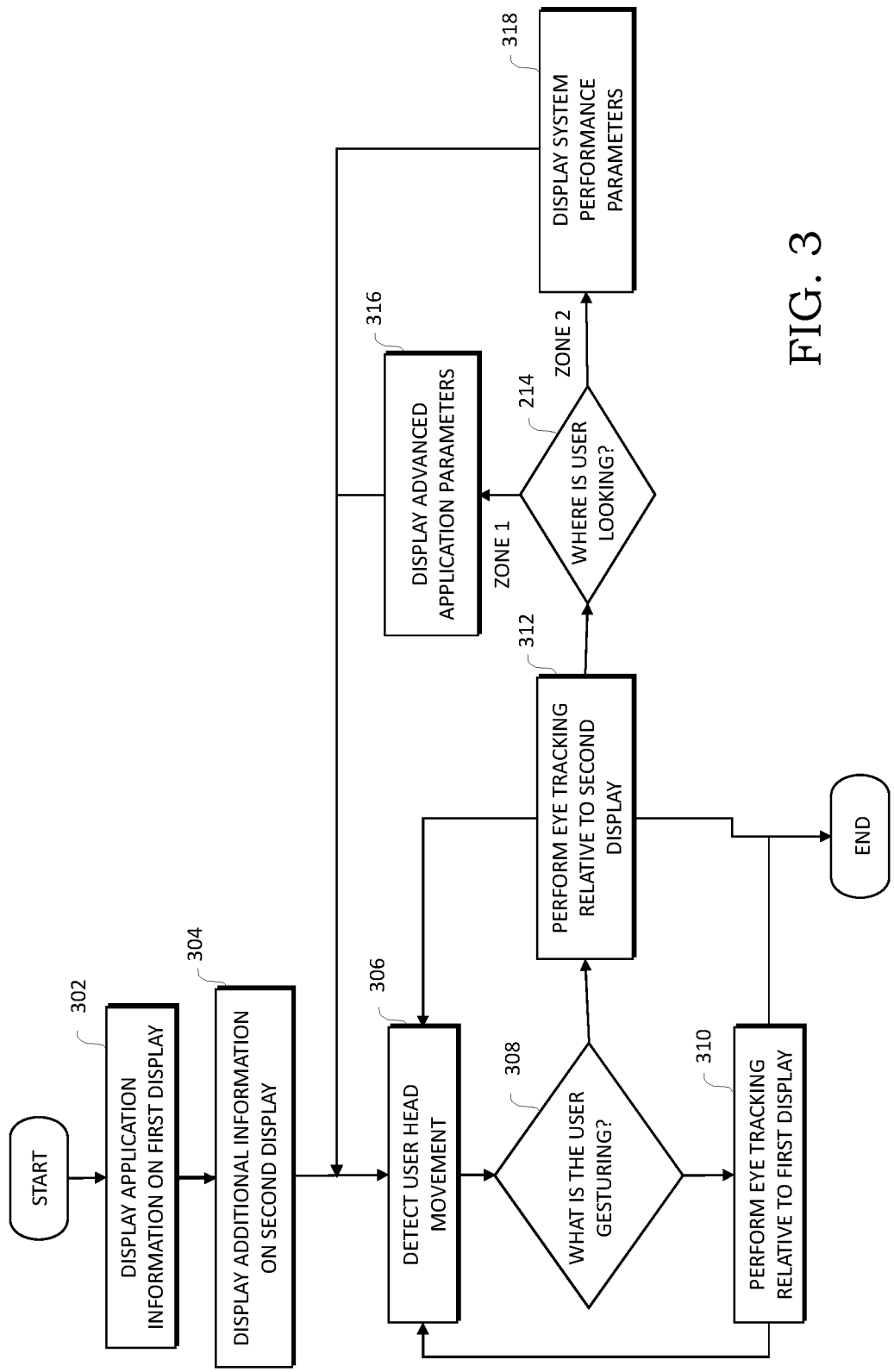
FIG. 3 is a flow diagram depicting steps for determining where a user is looking relative to an information handling system and displaying information based on the location, illustrating a method for gesture enablement and information provisioning.
Figure 4A:
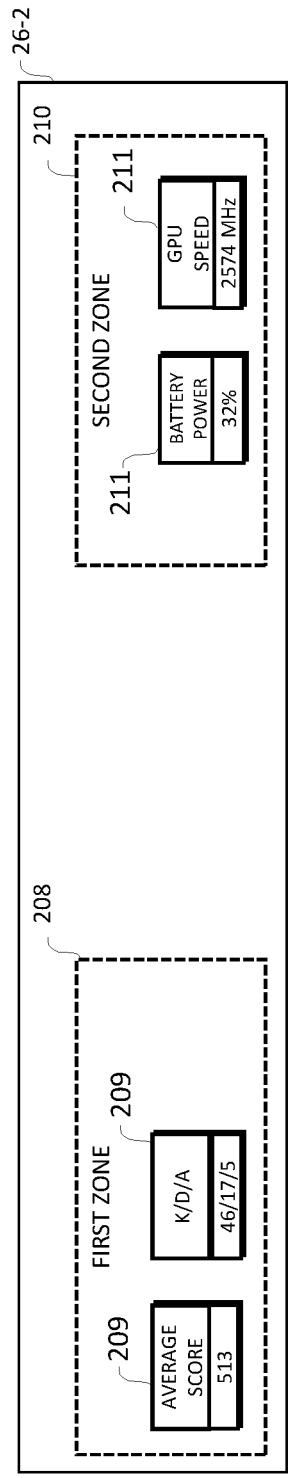
FIG. 4A depicts a front view of a second display configured to display basic application parameters and basic system performance parameters.
Figure 4B:
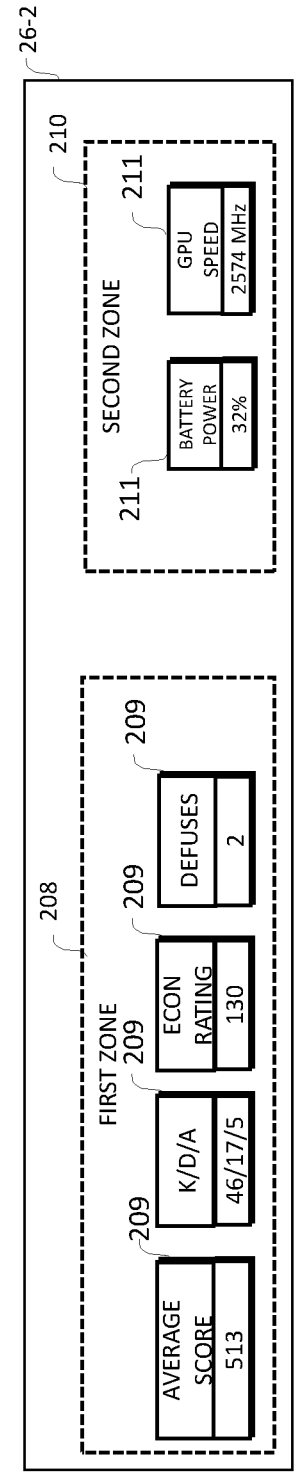
FIG. 4B depicts a front view of a second display configured to display advanced application parameters and basic system performance parameters.
Figure 4C:
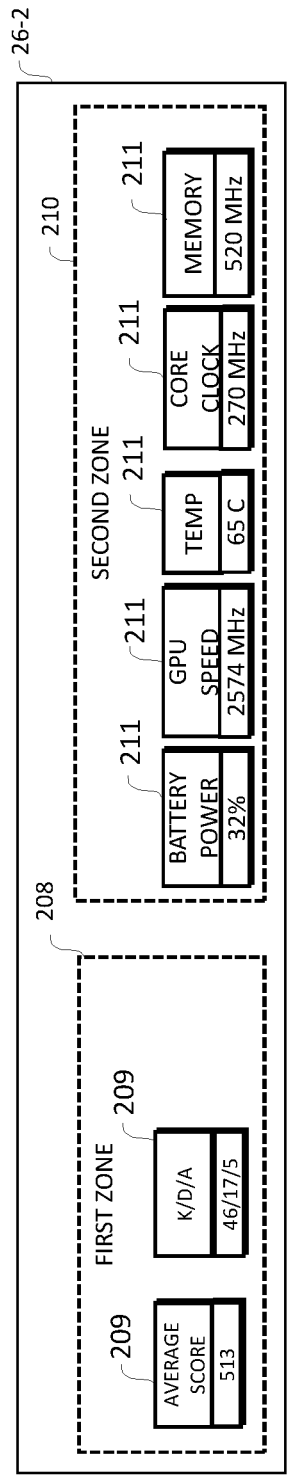
FIG. 4C depicts a front view of a second display configured to display basic application parameters and advanced system performance parameters.

FIG. 3 depicts a flow diagram illustrating a method for gesture enablement and information provisioning and FIGS. 4A-4C depict views of second display 26-2 configured to show application parameters 209 and system performance parameters 211.

The method may begin at step 302 with information handling system 100 running application 24 and displaying application information 27 on first display 26-1.

At step 304, embodiments may display additional information on second display 26-2. Second display 26-2 may display basic application parameters 209 and basic system performance parameters 211. As depicted in FIG. 4A, second display 26-2 may be configured with first zone 208 displaying two application parameters 209 as basic application parameters 209 and second zone 210 displays two system performance parameters 211 as basic system performance parameters 211. In some embodiments, the text size for both basic application parameters 209 and basic system performance parameters 211 may be small.

In some embodiments, the user may select which application parameters 209 are displayed as basic application parameters 209. As depicted in FIG. 4A, basic application parameters 209 in a gaming environment may include two parameters such as average score (e.g., 513) and parameters of a K/D/A (kills/death/assist) ratio (e.g., 46/17/5).

Basic system performance parameters 211 may be a small number of system performance parameters 211 and may be displayed with smaller text or no text. The set of basic system performance parameters 211 may be determined by information handling system 100 or selected by a user. For example, in a gaming environment, basic system performance parameters 211 may include battery power (e.g., 32%) and GPU speed (e.g., 2574 MHz).

At step 306, embodiments may detect the user head is moving. In some embodiments, biometric sensor 30 may communicate a signal to device processor 112 indicating the user head is moving.

At step 308, in response to determining that the user head is moving, embodiments may determine what the user is gesturing. In some situations, biometric sensor 30 may detect a face and determine the user head is moving but not gesturing. For example, a user may be looking at second display 26-2 and look down to the ground, wherein biometric sensor 30 may detect a movement but device processor 112 may determine the movement is not a gesture. Device processor 112 may further be able to determine the user glanced away but immediately returned to viewing first display 26-1 or second display and determine the movement is not a gesture.

Embodiments may determine the user head is moving in response to an action or image depicted on first display 26-1. At step 310, if device processor 112 determines that the user is still viewing first display 26-1, embodiments may use biometric sensor 30 to track eye movements of the user relative to first display 26-1. In some embodiments, biometric sensor 30 may communicate signals to processor 12, wherein processor 12 may use signals from biometric sensor 30 as inputs for application 24.

Device processor 112 may analyze signals from biometric sensor 30 and determine that the user head is tilting to indicate the user wants to switch from looking at first display 26-1 to looking at second display 26-2 or switch from looking at second display 26-2 to looking at first display 26-1. In some situations, in response to biometric sensor 30 sending a signal indicating the user head is moving, device processor 112 may determine the movement is a gesture to indicate the user wants to view information displayed on second display 26-2.

At step 312, if the head movement indicates the user is indicating the user is wanting to look at information on second display 26-2, embodiments may use biometric sensor 30 to track eye movements of the user relative to second display 26-2.

At step 314, if the head movement indicates the user is indicating the user is wanting to see information on second display 26-2, biometric sensor 30 may detect where the user is looking on second display 26-2. In some embodiments, biometric sensor 30 may communicate signals to processor 12 and device processor 112 executes instructions to perform eye tracking.

In some situations, a user may be wanting to view advanced application parameters 209 displayed in first zone 208. At step 316, if the user is looking in the direction of first zone 208, embodiments may display advanced application parameters 209. Displaying advanced application parameters 209 may include increasing a size of first zone 209, enlarging text size of one or more application parameters 209 or increasing the number of application parameters 209 displayed in first zone 208. For example, referring to FIG. 4B, if embodiments determines the user is looking in the direction of first zone 208, embodiments may display four application parameters 209 (e.g., average score, K/D/A, Econ rating and defuses) in first zone 208 with each application parameter 209 displayed with larger text as compared with system performance parameters 211 displayed in second zone 210.

In some situations, a user may be wanting to view advanced system performance parameters 211 displayed in second zone 210. At step 318, if the user is looking in the direction of second zone 211, embodiments may display advanced system performance parameters 211. Displaying advanced system performance parameters 211 may include increasing a size of second zone 210, enlarging text size of one or more system performance parameters 211 or increasing the number of system performance parameters 211 displayed in second zone 210. For example, referring to FIG. 4C, if embodiments determines the user is looking in the direction of second zone 210, embodiments may display five system performance parameters 211 (e.g., battery power, GPU speed, temperature, core clock speed and memory speed) in second zone 210 with each system performance parameter 211 displayed with larger text as compared with application parameters 209 displayed in first zone 208.

If biometric sensor 30 detects the user is viewing first display 26-1, embodiments may be configured to display basic application parameters 209 and basic system performance parameters 211 on second display 26-2. Alternatively, if biometric sensor 30 detects the user is viewing first display 26-1, embodiments may maintain second display 26-2 in the last configuration before the user switched to viewing first display 26-1.

The method may end when information handling system 100 stops running application 24.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for provisioning information to a user, the method comprising:
    displaying, on a first display of an information handling system, information associated with a gaming application running on the information handling system, the information based on user inputs received from a handheld controller;
    determining a plurality of application parameters associated with the gaming application running on the information handling system and a plurality of system performance parameters for the information handling system, wherein the set of application parameters comprises two or more of a total, an average, a ratio and an efficiency associated with a user, wherein the plurality of system performance parameters comprises two or more of a battery power, a temperature and a processor speed associated with the information handling system;
    displaying, on a second display, a first set of the plurality of application parameters in a first zone and a first set of the plurality of system performance parameters in a second zone;
    detecting a user gesture comprising detecting a face and determining an orientation of the face;
    determining if the user gesture corresponds to the user viewing the first display or the second display;
    if the user gesture corresponds to the user viewing the first display, analyzing biometric information associated with the user relative to the gaming application running on the information handling system;
    if the user gesture corresponds to the user viewing the second display:

analyzing biometric information associated with the user to determine if the user is viewing the first zone or the second zone, and
if the user is viewing the first zone:
increasing a size of the first zone; and
increasing the set of application parameters displayed in the first zone; and
if the user is viewing the second zone:
increasing a size of the second zone; and
increasing the set of system performance parameters displayed in the second zone.

2. The method of claim 1, wherein
increasing the set of application parameters displayed in the first zone further comprises increasing a size of a font of the set of application parameters displayed in the first zone; and
increasing the set of system performance parameters displayed in the second zone comprises increasing a size of a font of the system performance parameters displayed in the second zone.

3. The method of claim 2, wherein
increasing the set of information displayed in the first zone comprises displaying a second set of the plurality of application parameters, the second set of the plurality of application parameters comprising more application parameters than the first set of the plurality of application parameters; and
increasing the set of system performance parameters displayed in the second zone comprises displaying a second set of the plurality of system performance parameters, the second set of the plurality of system performance parameters comprising more system performance parameters than the first set of the plurality of system performance parameters.

4. The method of claim 1, wherein detecting a user gesture comprises detecting a face and determining a change in an orientation of the face.

5. The method of claim 4, wherein analyzing biometric information associated with the user to determine if the user is viewing the first zone or the second zone comprises tracking eye movement of the user.

6. The method of claim 1, wherein the plurality of application parameters are associated with the user's overall skill, teamwork, aggressiveness, or strategic or tactical execution of the gaming application.

7. The method of claim 1, wherein the plurality of system performance parameters comprises GPU frequency, CPU temperature, GPU temperature, memory upload speed, memory download speed and core clock speed.

8. A system comprising:
a first display of an information handling system displaying information associated with a gaming application running on an information handling system, the information based on user inputs received from a handheld controller;
a biometric sensor for detecting a user gesture; and
a processor communicatively connected to the biometric sensor and configured to:
communicate with the information handling system executing the gaming application;
determine a plurality of application parameters associated with the gaming application; and
determine a plurality of system performance parameters for the information handling system, wherein the set of application parameters comprises two or more of a total, an average, a ratio and an efficiency associated with a user, wherein the plurality of system performance parameters comprises two or more of a battery power, a temperature and a processor speed associated with the information handling system;
a second display displaying a first set of the plurality of application parameters in a first zone and a first set of the plurality of system performance parameters in a second zone;
wherein the processor is configured to:
determine if the user gesture corresponds to the user viewing the first display or the second display;
if the user is viewing the first display, perform eye tracking of the user relative to the gaming application running on the information handling system; and
if the user is viewing the second display;
analyze biometric information associated with the user to determine if the user is viewing the first zone or the second zone, and
if the user is viewing the first zone:
increasing a size of the first zone; and
increasing the set of application parameters displayed in the first zone; and
if the user is viewing the second zone:
increasing a size of the second zone; and
increasing the set of system performance parameters displayed in the second zone.

9. The system of claim 8, wherein the processor is configured to communicate with the biometric sensor and determine a change in an orientation of the face.

10. The system of claim 8, wherein the processor is configured to analyze eye tracking information associated with the user to determine if the user is viewing the first zone or the second zone.

11. The system of claim 10, wherein the processor is configured to increase a size of a font of the set of information displayed in the first zone or increase assize of a font in the second zone.

12. The system of claim 8, wherein:
increasing the set of application parameters displayed in the first zone comprises displaying a second set of the plurality of application parameters, the second set of the plurality of application parameters comprising more application parameters than the first set of the plurality of application parameters; and
increasing the set of system performance parameters displayed in the second zone comprises displaying a second set of the plurality of system performance parameters, the second set of the plurality of system performance parameters comprising more system performance parameters than the first set of the plurality of system performance parameters.

13. The system of claim 8, wherein the set of application parameters are associated with the user's overall skill, teamwork, aggressiveness, or strategic or tactical execution of the gaming application.

14. An information handling system, comprising:
a first display displaying application information corresponding to a gaming application running on the information handling system;
a second display displaying information comprising a first set of a plurality of application parameters associated with the gaming application running on the information handling system and a first set of a plurality of system performance parameters for the information handling system;
a biometric sensor for detecting a gesture of a user; and a processor communicatively connected to the biometric sensor, the processor configured to:
- determine if the gesture detected by the biometric sensor corresponds to the user viewing the first display or the second display;
- if the user is viewing the first display, perform eye tracking of the user relative to the application running on the information handling system; and
- if the user is viewing the second display, analyze biometric information associated with the user to determine if the user is viewing the first zone or the second zone and,
  - if the user is viewing the first zone;
    - increasing a size of the first zone; and
    - increasing the set of application parameters displayed in the first zone; and
  - if the user is viewing the second zone:
    - increasing a size of the second zone; and
    - increasing the set of system performance parameters displayed in the second zone.

15. The information handling system of claim 14, wherein the processor is configured to communicate with the biometric sensor and determine a change in an orientation of the face.

16. The information handling system of claim 14, wherein the processor is configured to analyze eye tracking information associated with the user to determine if the user is viewing the first zone or the second zone.

17. The information handling system of claim 16, wherein the processor is configured to increase a size of a font of the set of application parameters displayed in the first zone or a size of a font of the set of system performance parameters displayed in the second zone.

18. The information handling system of claim 14, wherein increasing the set of application parameters displayed in the first zone comprises displaying a second set of the plurality of application parameters, the second set of the plurality of application parameters comprising more application parameters than the first set of the plurality of application parameters; and
increasing the set of system performance parameters displayed in the second zone comprises displaying a second set of the plurality of system performance parameters, the second set of the plurality of system performance parameters comprising more system performance parameters than the first set of the plurality of system performance parameters.

19. The information handling system of claim 14, wherein the set of application parameters are associated with the user's overall skill, teamwork, aggressiveness, or strategic or tactical execution of the gaming application.

* * * * *